United States Patent Office 3,168,280
Patented Feb. 2, 1965

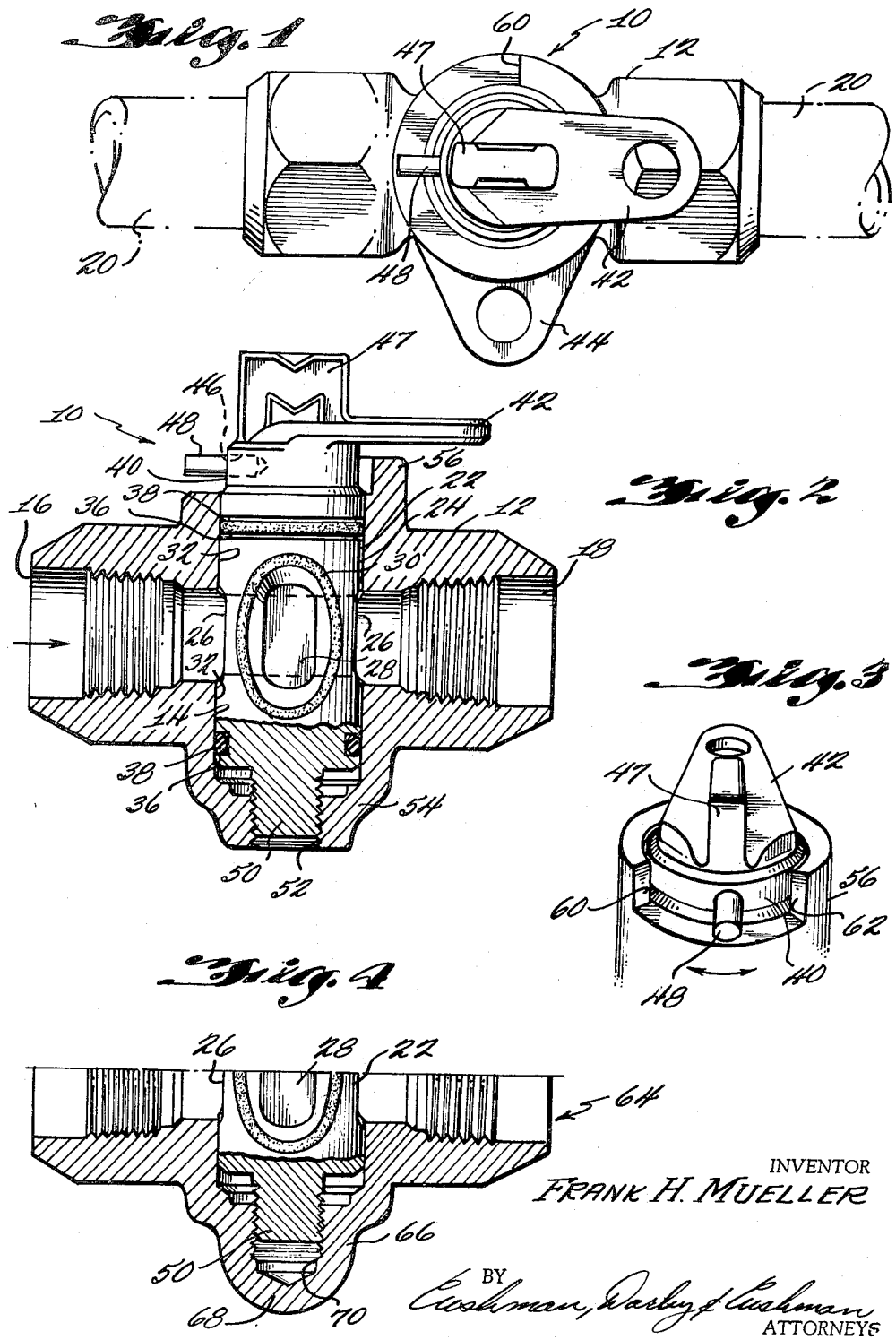

3,168,280
ROTARY PLUG VALVE
Frank H. Mueller, Decatur, Ill., assignor to Mueller Co., Decatur, Ill., a corporation of Illinois
Filed July 30, 1963, Ser. No. 298,744
12 Claims. (Cl. 251—217)

The present invention relates generally to a rotary plug valve and, more particularly, to a tamper-proof rotary plug valve. Valves of the type contemplated in the instant invention are commonly used in supply lines for domestic gas usually being connected into the line immediately ahead of the gas meter. Valves thus employed are commonly referred to as meter stops, and, obviously, it is highly desirable to prevent unauthorized disassembly or tampering with a meter stop to a degree which will cause leakage of gas to the atmosphere. Past experience has shown that meter stops oftentimes are tampered with by removing the plug-retaining means, thereby permitting the valve plug to be removed from its seat. Such unauthorized disassembly not only may damage the valve assembly, and thus impair its subsequent operation, but also, and of greater importance, result in gas leakage with the consequent danger of explosion.

In the past, efforts have been made to render meter stops temper-proof to an extent where they could not be disassembled with conventional tools, e.g., wrenches and pliers, usually available to a householder. These prior efforts, however, frequently have resulted in relatively complicated and cumbersome valve constructions which are both costly to produce and difficult to assemble. In addition, it is necessary that a tamper-proof valve construction be such as to not only discourage unauthorized disassembly, but also not unduly restrict or hinder assembly or required disassembly by authorized persons.

Accordingly, a principal object of the present invention is to provide a valve assembly that is of improved tamper-proof construction.

Another object of the present invention is to provide a rotary plug valve of simple construction which not only is tamper-proof, i.e., the plug cannot readily be removed from the valve body with ordinary tools, but also is of a construction which is readily assembled in the first instance.

A still further object of the present invention is to provide a tamper-proof rotary plug valve adapted for use as a meter stop having a simple construction which both discourages unauthorized disassembly and does not unduly hinder required disassembly by authorized persons.

Another object of the invention is to provide an easily assembled tamper-proof valve which combines in one element both a tamper-proof function and a rotation-limiting function, i.e., limiting movement of the plug to 90° in moving between open and closed position.

Other objects and advantages of the invention will become apparent from the following description and accompanying drawings in which:

FIGURE 1 is a plan view of a rotary plug valve embodying this invention with the valve being shown in its open position;

FIGURE 2 is a side view, partly in section, of the valve shown in FIGURE 1;

FIGURE 3 is a fragmentary perspective view of a portion of the valve shown in FIGURE 1, but showing the valve in a partially open position; and FIGURE 4 is a fragmentary side view, partly in section, showing a modified form of the present invention.

While the invention will be described with reference to a valve especially designed for use as a meter stop, it will be realized that the invention is applicable to other types of rotary plug valves.

Referring now to FIGURES 1, 2 and 3 of the drawings, there is shown a rotary plug valve 10 having a housing 12 provided with a cylindrical valve seat 14 of uniform diameter having diametrically opposite inlet and outlet ports 16 and 18, respectively. The ports 16 and 18 may be interiorly threaded at their outer ends for connecting the valve into the line 20 or may be adapted to employ other means such as flange connections, as are well known in the art. Rotatably mounted in the valve seat 14 is a valve plug 22 having an exterior cylindrical surface 24 of uniform slightly smaller diameter than that of the valve seat and coextensive therewith. The valve plug 22 may be either a hollow shell or a solid member formed with a flow passage having diametrically opposite ports 26 adapted to register with the seat ports 16 and 18 in the open position of the valve, so as to permit communication between the inlet and outlet ports 16 and 18.

Preferably, the plug 22 is provided with diametrically opposed false or blind ports 28 which are generally of the same configuration as the ports 26 and circumferentially located 90° therefrom. Surrounding that blind port 28 adapted to register with the inlet port 16 in the closed position of the valve is an endless groove of uniform depth, and an O-ring 30 of suitable resilient material is disposed in such groove for sealing engagement with the opposed surface 32 of the seat 14 so as to form a tight seal between the seat 14 and the plug 22 about the inlet port 16 when the valve is closed, thus effectively preventing "through" leaks, i.e., from the inlet port 16 to the outlet port 18. In addition, the valve seat 14 may be provided with diametrically opposed recesses or blind ports (not shown) located 90° from the seat ports 16 and 18 and which are shaped similarly to the blind ports 28. The plug false ports 28 register with the seat ports 16 and 18 and the seat false ports register with the plug ports 26 in the closed position of the valve. In the open position of the valve, the plug false ports 28 register with the seat false ports. The provision of these false ports both reduces the area of engagement between the plug 22 and its seat 14, to thus reduce resistance to turning movements of the plug, and eliminates prolonged exposure of any portions of the plug and seat sealing surfaces to corrosive action of the fluid controlled by the valve.

As best seen in FIGURE 2, the cylindrical sealing surfaces formed on the exterior of the valve plug 22 are provided with endless circumferential grooves 36 axially spaced above and below the ports 26. In these grooves are disposed O-rings 38 of a suitable pressure-deformable resilient material adapted to sealingly engage the opposed surface 32 of the seat 14. Such rings are now well known in the art, and are commonly made of solid rubber or of a synthetic composition which is very dense and yet possesses great liveliness and elasticity. Each O-ring is of slightly less inner diameter than the bottom of its groove, and each ring is of somewhat greater diameter in radial section than the depth of its respective groove, whereby when the valve plug 22 is inserted in the valve seat 14, as in FIGURE 2, the ring is compressed between the bottom of the groove and the opposed surface of the seat. Thus, fluid-tight end seals are formed between the exterior surface of the valve plug and the interior surface of the valve housing, as a result of the simple act of inserting the plug into the seat of the valve housing. Of course, the invention would contemplate reversing or altering the arrangement of sealing parts on the respective members. That is, the circumferential grooves wherein the O-rings are disposed can be formed in the valve seating surface 14 rather than in the valve plug 22.

At one end, the plug 22 has a cylindrical portion 40 of reduced diameter, located outwardly beyond the valve seat which is preferably provided with a laterally extending lock wing 42 having an aperture therein. The aperture in the lock wing 42 is alignable, in the closed position of the valve, with a corresponding aperture in a lock wing 44 on the housing 12, so that a suitable locking means such as padlock, bolt, seal or the like (not shown) may be inserted through the apertures in both lock wings to lock the valve in its closed position. It should be noted that the lock wing 42 extends in a direction parallel to the direction of the flow passage formed in the valve plug 22. Thus, since the lock wing 42 extends in a direction longitudinally of the housing, i.e., parallel to the direction of fluid flow when the valve is open, and in a direction transversely of the housing when the valve is closed, the condition of service of the valve is readily determined by observation of the position of the lock wing 42 relative to the housing 12. The reduced cylindrical portion 40 of the plug also is provided, diametrically opposite the lock wing 42, with a blind hole or socket 46 which is adapted to receive and firmly hold the end portion of a retaining or check pin 48. The check pin 48, which extends radially outward of the cylindrical portion 40, is of such dimension that it must be driven into the blind hole 46 with a force fit so that it cannot be readily removed except by a drilling-out operation. Such drilling-out operation will, of course, result in the defunctionalization of the valve check assembly. The cylindrical portion 40 is also provided with an axially outwardly extending noncircular portion 47 adapted to receive an appropriate turning tool (not shown), such as a wrench. The other end of the plug 22 is provided with a depending retaining extension 50 which is threaded to mate with an interiorly threaded bore 52 of reduced diameter formed in a housing extension 54. It should be noted that the threads formed on the retaining extension 50 and the threaded bore 52 are such that when the valve is in the open position the flow passage formed in the valve plug 22 will be aligned with the ports 16 and 18 formed in the housing 12.

As best seen in FIGURES 1 and 3, the end of the seat opposite the extension 54 is provided with a housing extension 56 of enlarged interior diameter which has a segment cut away to receive the protruding end of the pin 48 and provide angularly spaced abutment surfaces 60 and 62 which are adapted to be alternatively engaged by the pin 48 to thereby limit the rotational movement of the valve plug 22 to 90° in turning between open and closed position.

In assembling the plug valve just described, the plug 22 is mounted within the valve seat 14 by screwing or threading the plug-retaining stem 50 into the threaded bore 52 formed in the lower housing extension 54. When the proper location of the plug 22 within the valve seat 14 is obtained, the pin 48 is driven into the blind hole 46 formed at the desired location in the upper reduced cylindrical portion 40 of the plug. The location of the retaining pin receiving hole 46 and thus the pin 48 is such that the rotational movement of the valve plug 22 is limited to 90° between the open and closed positions. The rotational check formed by the pin 48 and the abutments 60 and 62 prevents unscrewing or disengagement of the valve plug retaining extension 50 from the threaded bore 52 of the housing 12, and thereby provides a tamper-proof valve assembly of simple construction. In order to disassemble the valve, it would be necessary to drill out the pin 48 so that the plug retaining extension 50 may be unscrewed from the threaded bore 52. The slight axial movement of the plug 22 relative to the valve seat 14 during movement between the open and closed positions, does not impair the functioning of the valve, and, in fact, effects a massaging of all of the O-rings which is believed to aid in their sealing function.

Referring now to FIGURE 4 of the drawings, there is shown a modified form of a valve 64 embodying the invention. The construction of the valve 64 differs from that of the valve 10, just described, in that the housing extension 66 is closed as at 68, and is provided with an interiorly threaded socket 70 adapted to threadingly engage the retaining extension 50 formed on the valve plug 22. Such a "closed bottom" construction, as it is known in the art, permits elimination of the O-ring at the adjacent end of the valve seat since the closed extension 66 prevents communication between the adjacent end of the valve seat and the atmosphere. As was the case with the embodiment shown in FIGURES 1, 2 and 3, the valve 64 of FIGURE 4, when assembled, will be tamper-proof since the engagement of the retaining pin carried by the plug, with the shoulders formed on the valve housing, will prevent disengagement of the threaded plug retaining extension 50 from the threaded socket 70.

While in the foregoing embodiments of the invention the valve plug has been provided with a threaded extension which matingly engages a threaded bore formed in the lower portion of the valve housing, it will be apparent that other retaining connections permitting rotation of the plug relative to the valve seat may be employed. For example, a bayonet-type connection can be satisfactorily employed wherein, after assembly of the valve plug within the valve seat, the rotational check formed by the pin and shoulders prevents operative alignment of the disengagement slots formed in one member with the engaging projections formed on the mating member. Furthermore, while the foregoing invention has been illustrated in connection with cylindrical rotary plug valves, it will be apparent to those skilled in the art that the invention is applicable to other valve constructions such as the well known tapered rotary plug valve construction.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. A rotary plug valve comprising: a housing member having a circular valve seat provided with at least one flow port; a plug member rotatable in said seat and having a flow passage terminating in at least one radial port movable into or out of registration with said seat port to open or close the valve; interengageable means associated with said members for retaining said plug member in operative relation with said seat when said plug member is in its open or closed positions and during rotation therebetween, said means being disengageable by rotation of said plug member through an angle greater than that through which said plug member rotates in moving between said open and closed positions; and check means associated with said members operative to limit the rotation of said plug member to movement between said open and closed positions, whereby removal of said plug member from said operative relation with said valve seat is effectively thwarted and may be accomplished only after defunctionalization of said check means.

2. The structure defined in claim 1 wherein the retaining means includes means defining an arcuate recess in one of the members coaxial with the seat and at least one mating projection formed on the other member and extending into said recess, and the check means includes means defining a pair of angularly spaced abutments on one of said members and pin means carried by the other of said members and alternatively engageable with said abutments.

3. The structure defined in claim 1 wherein the retaining means includes mating threads on the members and the check means includes means defining a pair of angularly spaced abutments on one of said members and pin means carried by the other of said members and alternatively engageable with said abutments.

4. The structure defined in claim 3 wherein the threads are integral with the members and disposed adjacent one end of the seat, the abutments are integral with the housing member and disposed adjacent the other end of said seat, and the pin means is carried with a drive fit in a radial socket in the plug member.

5. A rotary plug valve comprising: a housing member having a circular valve seat provided with diametrically opposed inlet and outlet ports; a valve plug member rotatable in said seat and having a flow passage movable into and out of registration with said ports to open and close the valve; means defining at least one circumferential packing groove in one of the opposed surfaces of said members adjacent at least one end of said seat; a resilient pressure-deformable packing ring in said groove of sufficient size in radial section to contact both the bottom of its groove and the other of said surfaces to form a seal therebetween; means for sealing the other end of said seat; interengageable means associated with said members for retaining said plug member in operative relation with said seat when said plug member is in its open or closed positions and during rotation therebetween, said interengageable means being disengageable by rotation of said plug member through an angle greater than that through which said plug member rotates in moving between said open and closed positions; check means associated with said members and operative to limit the rotation of said plug member to movement between said open and closed positions, whereby removal of said plug member from said operative relation with said valve seat is effectively thwarted and may be accomplished only after defunctionalization of said check means; means defining an endless packing groove in said plug member adapted to surround said inlet port in said closed position of the valve; and a resilient pressure deformable packing ring in said last-mentioned groove and of sufficient size in radial section to contact both the bottom of said last-mentioned groove and the surface of said seat to form a seal therebetween.

6. The structure defined in claim 5 wherein the retaining means includes means defining an arcuate recess in one of the members coaxial with the seat and at least one mating projection formed on the other member and extending into said recess, and the check means includes means defining a pair of angularly spaced abutments on one of said members and pin means carried by the other of said members and alternatively engageable with said abutments.

7. The structure defined in claim 5 wherein the retaining means includes mating threads on the members, and the check means includes means defining a pair of angularly spaced abutments on one of said members and pin means carried by the other of said members and alternatively engageable with said abutments.

8. The structure defined in claim 7 wherein the threads are integral with the members and disposed adjacent one end of the seat, the abutments are integral with the housing member and disposed adjacent the other end of said seat, and the pin means is carried with a drive fit in a radial socket in the plug member.

9. A rotary plug valve comprising: a housing member having a cylindrical valve seat provided with diametrically opposed inlet and outlet ports; a cylindrical valve plug member rotatable in said seat and having a flow passage movable into and out of registration with said ports to open and close the valve; a reduced extension on one end of said plug member; interengageable threads on said extension and said housing member for retaining said plug member in operative relation in said seat; said threads being disengageable by rotation of said plug member only through an angle greater than 90°; and check means for limiting rotation of said plug member to movement between said open and closed positions including a pair of angularly spaced abutments on said housing member adjacent that end of said seat opposite said threads, and pin means carried by a drive fit in a radial socket in said plug member and alternatively engageable with said abutments, whereby said plug member can be removed from said valve seat only on removal of said pin means.

10. The structure defined in claim 9 including a pair of circumferential grooves in one of the opposed surfaces of said plug member and said seat on opposite sides of said flow passage and a resilient pressure-deformable packing ring in each of said grooves and engaged with the bottom of its respective groove and the other of said opposed surfaces to form a seal between said plug member and said seat.

11. The structure defined in claim 9 in which the seat is closed, at that end thereof adjacent the threads, by an integral portion of the housing member and including a circumferential groove in one of the opposed surfaces of said plug member and said seat adjacent the other end of the latter and a resilient pressure-deformable packing ring in said groove and engaged with the bottom thereof and with the other of said opposed surfaces to form a seal between said plug member and said seat.

12. The structure defined in claim 9 including an endless groove in one of the opposed surfaces of said plug member and said seat and arranged to surround one of said seat ports in the closed position of the valve, and an endless pressure-deformable resilient packing ring disposed in said groove and engaged with the bottom thereof and the other of said opposed surfaces to form a seal between said plug member and said seat in the closed position of the valve.

References Cited in the file of this patent
UNITED STATES PATENTS
1,791,843    Green _____ Jan. 21, 1919